April 22, 1924. Re. 15,821
J. H. KENDIG
PROCESS AND APPARATUS FOR DRAWING SHEET GLASS
Original Filed July 19, 1916
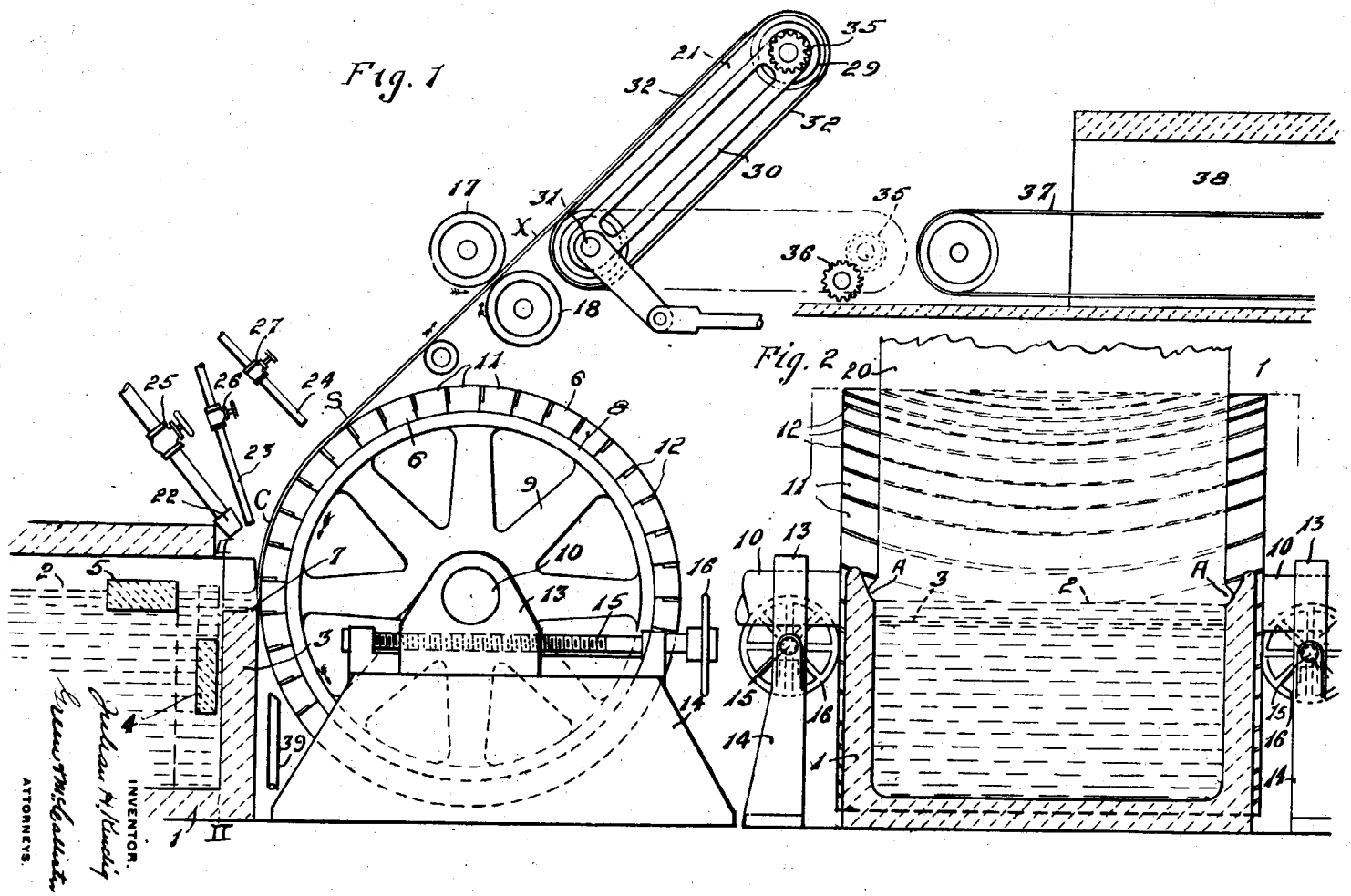

Reissued Apr. 22, 1924. Re. 15,821

UNITED STATES PATENT OFFICE.

JULIAN H. KENDIG, OF EDGEWOOD, PITTSBURGH, PENNSYLVANIA, ASSIGNOR TO THE LIBBEY-OWENS SHEET GLASS COMPANY, OF TOLEDO, OHIO, A CORPORATION OF OHIO.

PROCESS AND APPARATUS FOR DRAWING SHEET GLASS.

Original No. 1,305,288, dated June 3, 1919, Serial No. 110,096, filed July 19, 1916. Application for reissue filed June 1, 1921. Serial No. 474,226.

*To all whom it may concern:*

Be it known that I, JULIAN H. KENDIG, a citizen of the United States, residing at Edgewood, Pittsburgh, in the county of Allegheny and State of Pennsylvania, have invented certain new and useful Improvements in Processes and Apparatus for Drawing Sheet Glass, of which the following is a specification.

This invention relates to a process and apparatus for drawing sheet glass, and has for its principal objects the provision of a process and apparatus whereby glass may be continuously drawn from a tank in the form of a flat sheet; the provision of an apparatus whereby the glass is supported while being drawn for the purpose of maintaining the glass in the form of a flat sheet, without marring the surface thereof; the provision of a machine that will form at a minimum of cost, sheet glass, free of blemishes and uniform in thickness, and such other objects as may hereinafter appear.

One embodiment of the invention is illustrated in the accompanying drawings, wherein:

Figure 1 is a side elevation of the apparatus showing the tank and leer in section; and Fig. 2 is a section on the line II—II of Fig. 1.

The apparatus comprises a tank 1 containing a body of molten glass 2 which is maintained at a constant level by any convenient means.

The delivery end of the tank is open at its front end to permit glass to flow over the top edge of the front wall 3 while the apparatus is in operation. A gate 4 is provided to extend across the end of the tank for the purpose of closing the discharge opening when the apparatus is not in operation. When the apparatus is in operation, the gate 4 is held beneath the surface of the glass by any convenient means, and when it is desired to shut off the flow of glass, the gate 4 is elevated so that the top edge thereof projects above the surface of the glass.

A skimmer 5 extends from one side of the tank to the other and is for the purpose of preventing the impure surface glass from flowing out of the tank. The glass passing to the drawing opening, therefore, must come from beneath the surface where the purest glass is obtained.

A cylindrical supporting roll 6 is positioned adjacent the end wall 3 so that the axis thereof is approximately on the same level as the glass in the tank, and so that the surface of the roll almost touches the top outside corner 7 of the end wall. The roll consists of a supporting rim or cylinder 8 carried by the spokes 9 and is provided with a bearing shaft 10 extending through the center thereof and projecting beyond the ends of the roll. Upon the rim or cylinder 8 is mounted a series of planks 11 made preferably of bass wood, or a composition of bass wood sawdust and molasses, which has been baked in molds. Any substance that is non-heat conducting and will not scratch or score the glass might be substituted, but it has been found that bass wood or the composition just referred to or any substance that will be carbonized with a smooth char is preferable.

The planks or blocks 11 may be secured to the rim 8 by any suitable means, and are preferably sawed or molded with curved sides with a portion of one of the curved sides cut away to form a deep narrow groove 12 between each plank or block. When the planks are mounted upon the rim, the grooves 12 will be curved as shown in Fig. 2, and the reason for the curved grooves will hereinafter appear.

The roll is mounted for rotation upon movable bearings 13 through which the ends of the shaft 10 project, and sufficient space is provided between the bearings and the ends of the roll so that the roll may be moved back and forth in the direction of its axis and transversely of the tank 1. The bearings 13 are slidably mounted upon bases 14 and are adapted to be moved toward and away from the tank 1 by means of the screws 15 which are threaded through the bearings and supported and held against longitudinal movement by the base. When the wheels 16 are simultaneously turned the bearings will be moved either toward or away from the end of the tank. Because of this adjustment the surface of the roll can be maintained at the proper distance from the front end wall of the tank.

Sheet glass is formed as follows: A cold sheet of glass is placed between the drawing rolls 17 and 18 which are adapted to be turned in either direction. The roll 6 is rotated preferably anti-clockwise, so that the surface thereof above the level of the glass moves toward the glass. The gate 4 is then lowered, permitting the molten glass to come in contact with the surface of the roll at 19. The heat of the glass will char or carbonize the surface of the planks or blocks uniformly over the revolving surface thereof but the blocks are burned only to a limited depth because the surface is continuously moving and is being cooled by the surrounding air when not in contact with the glass. After a smooth, velvety, uniform char has been formed on the entire surface of the roll, it is in condition for the forming of a glass sheet.

The drawing rolls 17 and 18 are now turned so as to lower the cold sheet, which serves as a "bait," into the glass for the purpose of starting a sheet of glass the same width as the cold sheet or bait. When the glass has adhered to the lower edge of the cold sheet, the rolls 17 and 18 are reversed so that the plastic sheet will be slowly drawn up over the surface of the revolving roll 6. The roll 6 is turned so that the surface thereof moves considerably faster than the glass being drawn over it. Therefore, each particle of the under surface of the glass is being continuously rubbed or stroked in a path parallel with the path of the draw and is prevented from moving toward the center of the sheet by the tendency of the roll to maintain it in a straight path parallel to the path of the draw. Because of this tendency of the roll to keep each particle in a straight path and because of the support that the roll affords the glass while it is plastic, the sheet maintains its original width indefinitely. The glass adjacent the surface will tend to cling to the side wall of the tank and will draw out slightly as at A. This formation assists in maintaining the full width of the sheet at the point where the glass leaves the main body of glass.

A further condition which assists in maintaining the glass in sheet form is the contact which the glass has with the roll at 19 beneath the surface of the glass. The glass is partially cooled throughout the width of the sheet beneath the surface and therefore receives an initial hardening in sheet form before it leaves the surface of the glass. This hardening action beneath the surface of the glass assists in preventing the cohesive action tending to draw the glass to the center, before the sheet emerges from the surface. Thus, the under surface of the sheet is hardened and forms a base or support for the upper surface of the sheet which receives its glass from the surface of the glass in the tank.

The curved grooves 12 are provided to stroke the glass away from the center toward the edges when the roll is turned anti-clockwise, to assist in preventing the particles of glass from moving toward the center of the sheet. It is preferable to turn the roll so that the surface thereof moves in the direction opposite to that in which the glass is being drawn, but the roll may be turned in the reverse direction, in which event the roll should be reversed so that the curved grooves thereof will always tend to stroke the glass away from the center. Another function of the groove is to conduct any gases formed by the combustion of the wood away from the under side of the glass.

Because the surface of the roll moves at a higher velocity than the surface of the glass, the sheet is maintained at its original width, and is at the same time polished while being formed. The roll is also prevented from burning on account of this relative velocity of the roll with respect to the glass.

Assuming that a sheet of glass has been drawn past the rolls 17 and 18 by the cold sheet "bait," the operation is thereafter continuous. The rolls 17 and 18 continue to turn in the direction of the arrows, and continuously draw the glass sheet 20 over the roll 6 and deposit it upon an endless belt carrier 21 to be hereinafter described.

The driving rolls 17 and 18 and the carrier 21, which are merely shown diagrammatically, may be moved so that the point of tangency of the sheet 20 with respect to the roll 6 may be shifted to suit operating conditions, but it is preferable that the glass should not leave the wheel surface until it is just ready to "set" or become hard, so that the sheet is stretched straight before it finally hardens. For the purpose of controlling the temperature of the sheet so that it will "set" or harden just after it leaves the wheel or at the point marked S, a gas burner 22 and air pipes 23 and 24 are provided. The flow of gas is regulated by the valve 25 and the air pipes 23 and 24 are controlled by valves 26 and 27, respectively. By manipulation of these valves the temperature of the sheet may be regulated and the glass kept from cooling abruptly. Means for absorbing the heat, such as water cooled tubes placed adjacent the surface of the glass, may be used in place of the air pipes for regulating the temperature of the sheet. One reason for preferably turning the wheel 6 so that its surface moves in a direction opposite to that in which the glass is being drawn will be seen from the following.

Assuming that the glass is "set" hard above the point S, and sufficiently set below the point S to the point C to prevent the cohesive action of the molecules from drawing the molecules toward the center of the sheet, then the space in which there is a tendency for the cohesion of the molecules to draw them toward the center of the sheet is between the point C and the surface of the glass 2. A chain of molecules suspended pendent from the point C where they cannot move toward the center of the sheet will be stroked downward in a straight line, by the surface of the roll and because of the frictional engagement of the roll will be prevented from moving toward the center of the sheet. This action is further assisted by the curved grooves 12 which tend to stroke the molecules toward the edge of the glass.

After the glass passes the rolls 17 and 18, it passes upon the carrier 21 which consists of a pair of rollers 28 and 29 supported upon a frame 30 which is pivoted upon a shaft 31. An endless belt 32 passes over the rolls and is adapted to support the glass sheet. When the glass sheet extends to the roll 29, it is cut by any convenient means at the point X. The carrier is then moved downward about the shaft 31 by means of the rod 33 pivoted to the lever 34 secured to the carrier frame 30. When the belt 32 assumes the position indicated by the dotted line, the gear 35 on the roll 29 will mesh with the gear 36 as indicated. The gear 36 is continuously rotated and will drive the endless belt 32, thereby moving the glass sheet onto the carrier 37. This carrier conducts the sheet through a suitable leer 38 for the purpose of permitting the glass to cool gradually. After the sheet has been delivered to the leer carrier, the frame 30 is again elevated to receive and support the sheet being drawn. The rolls 17 and 18 and the carrier 21 may be incased in a suitably heated oven or extension of the leer to prevent sudden cooling of the glass as it is being drawn.

The temperature of the surface of the roll is regulated by means of one or more air blasts 39 arranged beneath the roll at suitable locations, and to insure uniform wearing of the surface, the roll is moved back and forth longitudinally quite slowly as the glass is being drawn.

It is obvious that the process may be carried out by a machine of different design and construction and many changes may be made in the details of operation and construction without departing from the spirit of the invention, and the invention is therefore not limited to the specific construction herein illustrated and described.

I claim as my invention:—

1. The herein described process of making sheet glass which consists in drawing a plastic sheet of glass directly from the surface of a body of molten glass upwardly, while plastic, over a smooth supporting surface that will not mar the glass, inclined from the perpendicular so as to support the glass in sheet form substantially from the point of emergence from the body of glass to a remote point, in moving the supporting surface which is in contact with the glass with respect to the glass while the glass is being drawn, and in permitting the glass to cool.

2. The herein described process of making sheet glass which consists in drawing a plastic sheet of glass directly from the surface of a body of molten glass upwardly, while plastic, over a carbonized supporting surface inclined from the perpendicular so as to support the glass substantially from the point of emergence from the body of glass to a remote point, in moving the supporting surface which is in contact with the glass with respect to the glass while the glass is being drawn, and in permitting the glass to cool.

3. The herein described process of making sheet glass which consists in drawing a plastic sheet of glass directly from the surface of a body of molten glass upwardly over a roll having a supporting surface that will not mar the glass disposed so as to support the glass in sheet form substantially from the point of emergence from the body of the glass to a remote point, in turning the roll so that the surface thereof which is in contact with the glass has relative movement with respect to the glass while the glass is being drawn, and in permitting the glass to cool.

4. The herein described process of making sheet glass which consists in drawing a plastic sheet of glass directly from the surface of a body of molten glass upwardly, while plastic, over a roll having a carbonized supporting surface disposed so as to support the glass substantially from the point of emergence from the body of glass to a remote point, in turning the roll so that the surface thereof which is in contact with the glass has relative movement with respect to the glass while the glass is being drawn, and in permitting the glass to cool.

5. The herein described process of making sheet glass which consists in drawing a plastic sheet of glass out of a body of molten glass, in supporting the sheet of plastic glass from the point where it leaves the body of molten glass substantially to the point where the glass hardens, upon a smooth surface, in moving the supporting surface with respect to the glass while the glass is being drawn and in permitting the glass to cool.

6. The herein described process of making sheet glass which consists in drawing a plastic sheet of glass out of a body of molten glass, in supporting the sheet of plastic glass from the point where it leaves the body of molten glass substantially to the point where the glass hardens, upon a carbonized supporting surface, in moving the supporting surface with respect to the glass while the glass is being drawn and in permitting the glass to cool.

7. The herein described process of making sheet glass which consists in drawing a plastic sheet of glass out of a body of molten glass, in supporting the sheet of plastic glass from the point where it leaves the body of molten glass substantially to the point where the glass hardens, upon a portion of the surface of a cylindrical roll having a smooth surface, in turning the roll so that the surface thereof has relative movement with respect to the glass while the glass is being drawn, and in permitting the glass to cool.

8. The herein described process of making sheet glass which consists in drawing a plastic sheet of glass directly from the surface of a body of molten glass upwardly, while plastic, over a roll having a supporting surface of soft carbon disposed so as to support the glass substantially from the point of emergence from the body of glass to a remote point, in turning the roll so that the surface thereof which is in contact with the glass moves in the direction opposite to that in which the glass is being drawn, and in permitting the glass to cool.

9. The herein described process of making sheet glass which consists in drawing a plastic sheet of glass directly from the surface of a body of molten glass upwardly over a cylindrical roll having a surface that will not mar the glass and so disposed as to support the glass in sheet form substantially from the point of emergence from the body of the glass to a remote point, in turning the roll so that the surface thereof which is in contact with the glass has relative movement with respect to the glass and in permitting the glass to harden just after it leaves the curved surface of the roll.

10. The herein described process of making sheet glass which consists in drawing a plastic sheet of glass directly from the surface of a body of molten glass, in drawing the sheet while plastic upwardly over a cylinder having a surface composed of a substance adapted to be carbonized by the heat of the glass and disposed so as to support the glass substantially from the point of emergence from the body of the glass to a remote point, in turning the roll so as to intermittently move the particles of the surface out of contact with the glass to retard combustion thereof, and in permitting the glass to cool.

11. The herein described process of making sheet glass which consists in drawing a plastic sheet of glass directly from the surface of a body of molten glass, in drawing the sheet upwardly while plastic over a smooth relatively non-heat conducting supporting surface disposed at an angle from the perpendicular so as to support the glass substantially from the point of emergence from the body of glass to a remote point, in moving the supporting surface which is in contact with the glass with respect to the glass while the glass is being drawn, and in permitting the glass to cool.

12. The herein described process of making sheet glass which consists in drawing a plastic sheet of glass out of a body of molten glass, in drawing the sheet over a smooth supporting surface while plastic, in stroking the entire sheet of glass in a direction from the center of the sheet toward the edges thereof while plastic and in permitting the glass to cool.

13. The herein described process of making sheet glass which consists in drawing a plastic sheet of glass upward out of a body of molten glass, in stroking the entire sheet of glass in a direction from the center of the sheet toward the edges thereof while plastic and in permitting the glass to cool.

14. The herein described process of making sheet glass which consists in drawing a plastic sheet of glass upward out of a body of molten glass, in drawing the sheet over a roll having a smooth supporting surface in contact with the surface of the body of the glass, in separating the sheet from the roll tangent to the surface thereof at an angle less than a right angle to the perpendicular, in supporting the glass in the plane of tangency as it separates from the surface of the roll, and in permitting the glass to harden directly after it separates from the roll.

15. The herein described process of making sheet glass which consists in drawing a plastic sheet of glass upward out of a body of molten glass, in drawing the sheet over a roll having a smooth supporting surface in contact with the surface of the body of the glass, in separating the sheet from the roll tangent to the surface thereof at an angle less than a right angle to the perpendicular, in supporting the glass in the plane of tangency as it separates from the surface of the roll, in permitting the glass to harden directly after it separates from the roll, in severing the glass in sections while supported in the plane of tangency and in lowering the sections to the horizontal plane after it has been severed.

16. In combination with a machine for drawing sheet glass having a tank for containing molten glass and a means for drawing glass directly from the surface thereof, a continuously turning roll provided with a surface that will not mar the glass and disposed so as to support the plastic glass in sheet form as it is being drawn substantially from the point of emergence of the sheet from the molten glass to a remote point, the surface of the roll in contact with the glass being adapted to be moved with respect to the surface of the glass in contact with the roll.

17. In combination with a machine for drawing sheet glass having a tank for containing molten glass and a means for drawing glass directly from the surface thereof, a continuously turning roll provided with a surface that will not mar the glass and disposed so as to support the plastic glass in sheet form as it being drawn substantially from the point of emergence of the sheet from the molten glass to a remote point, the surface of the roll in contact with the glass being adapted to be moved in a direction opposed to the direction in which the surface of the glass in contact with the roll is being drawn.

18. In combination with a machine for drawing sheet glass having a tank for containing molten glass, and a means for drawing glass therefrom, a roll adapted to be continuously rotated in contact with the surface of the molten glass for supporting the plastic glass in sheet form as it is being drawn upward over the roll, provided with a surface adapted to be carbonized by the heat of the glass in contact therewith, the said surface having relative movement with the glass in contact therewith.

19. In combination in a machine for drawing sheet glass having a tank for containing molten glass and a means for drawing glass therefrom, a roll adapted to be continuously rotated for supporting the plastic glass in sheet form as it is being drawn provided with a surface having grooves on the surface thereof arranged so that the edges of the grooves will stroke the glass from the center of the sheet toward the edges as the glass is being drawn over the surface of the roll.

20. In combination in a machine for drawing sheet glass having a tank for containing molten glass and a means for drawing glass therefrom, a continuously turning roll for supporting the plastic glass in sheet form as it is being drawn provided with a surface having curved grooves on the surface thereof arranged so that the edges of the grooves will stroke the glass from the center of the sheet toward the edges as the glass is being drawn over the surface of the roll.

21. The herein described process of making sheet glass which consists in placing a roll having a surface that will not mar the glass adjacent the discharge opening of a tank containing molten glass, in flowing molten glass through the discharge opening against the surface of the roll, in drawing a sheet of glass out of the tank upwardly over the surface of the roll above the surface of the molten glass, and in turning the roll so that the surface thereof in contact with the glass has relative movement with respect to the glass in contact therewith.

22. The herein described process of making sheet glass which consists in placing a roll having a surface that will not mar the glass adjacent the discharge opening of a tank containing molten glass, in flowing molten glass through the discharge opening against the surface of the roll, in drawing a sheet of glass out of the tank upwardly over the surface of the roll above the surface of the molten glass, and in turning the roll so that the surface thereof in contact with the glass moves in a direction opposite to the direction in which the glass is being drawn.

23. A machine for drawing sheet glass comprising in combination, a tank for containing molten glass provided with a lateral discharge opening, a roll having a surface which will not mar the glass adjacent the discharge opening so as to engage the horizontal surface of the glass in the tank and having a portion of its surface extending above the surface of the glass in the tank, and means for drawing a sheet of glass from the molten glass upwardly over the roll as the roll is rotated.

24. A machine for drawing sheet glass comprising in combination, a tank for containing molten glass, a support in engagement with the glass having a portion of its surface inclined at an angle to the perpendicular above the surface of the glass, means for drawing a sheet of glass upward over the support at an angle less than a right angle to the perpendicular, means for supporting the glass at the prescribed angle while being drawn, and means for lowering the glass to a horizontal position after the sheet is drawn.

25. A machine for drawing sheet glass comprising in combination, a tank for containing molten glass, a roll having a surface that will not mar the glass in engagement with the surface of the glass having a portion of its surface above the surface of the glass, means for drawing a sheet of glass upwardly over the surface of the roll and out of engagement therewith at an angle less than a right angle to the perpendicular, means for supporting a sheet at the prescribed angle while being drawn, and means for lowering the sheet to a substantially horizontal position after the sheet has been drawn.

26. The herein described process of drawing sheet glass which consists in placing a support having a surface that will not mar the glass adjacent the discharge opening of a tank containing molten glass so that it projects above the surface thereof, in flowing molten glass horizontally through the discharge opening against the surface of the support and in drawing a sheet of glass upwardly over the support to maintain it in sheet form while plastic.

27. In sheet glass forming apparatus, the combination with means for drawing a sheet of glass upwardly from a supply of molten glass, of a support over which the glass is drawn and having a supporting surface adapted to be moved faster than the glass and in the opposite direction to the movement of the glass.

28. In a sheet glass forming apparatus, the combination with means for drawing a sheet of glass from a supply of molten glass, of a roll over which the glass is drawn adapted to be rotated at a different surface speed from that of the glass.

29. In a sheet glass forming apparatus, the combination with means for drawing a sheet of glass from a supply of molten glass, of a roll over which the glass is drawn adapted to be rotated in the opposite direction from that in which the glass is drawn.

30. In a sheet glass forming apparatus, the combination with means for drawing a sheet of glass from a supply of molten glass, of a support over which the glass is drawn adapted to polish the surface of the glass in contact therewith, the support being movable in the opposite direction from that in which the sheet is drawn to increase the rate of sliding contact between the sheet and support.

31. The herein described process of drawing sheet glass which consists in forming a sheet of glass, drawing it over a support, and moving the support in the direction opposite to the direction of travel of the sheet, whereby the sheet slidably engages the support and is smoothed as it is being drawn.

32. In sheet glass forming apparatus, the combination with means for drawing a sheet of glass from a supply of molten glass, of a direction changing roll over which the sheet of glass is drawn, adapted to be rotated at a different surface speed from that of the glass.

33. The combination with means for drawing a sheet of glass from a tank of molten glass, of a direction changing device having a curved surface over which the sheet is then passed and by which the direction of the sheet is changed while the glass is soft and plastic, said surface consisting of a material permitting relative sliding movement of the said surface and the surface of the glass in contact therewith while the glass is in said soft, plastic condition, means to rotate said device and thereby cause said sliding movement, and means to keep said surface of the said device at a low enough temperature to prevent its destruction by the heat of the glass.

34. In a sheet glass forming apparatus, the combination with means for drawing a sheet of glass from a tank of molten glass, a bending roll over which the glass is drawn and by which its direction is changed, the glass engaging surface of the roll being formed of wood and adapted to be moved with respect to the glass in contact therewith and means to control the temperature of the roll.

35. The combination with means for drawing a sheet of glass from a supply of molten glass, of a bending device over which the sheet is drawn and by which its direction is changed and adapted to be reciprocated as the glass is drawn thereover.

36. The combination with means for drawing a sheet of glass from a supply of molten glass, of a bending device over which the sheet is drawn and by which its direction is changed and adapted to be reciprocated in a direction transverse to that in which the sheet is drawn thereover.

37. The combination with means for drawing a sheet of glass from a supply of molten glass, of a bending roll over which the sheet is drawn and by which its direction is changed and adapted to be simultaneously rotated and reciprocated in the direction of its length.

38. The combination with means for drawing a sheet of glass from a supply of molten glass, of a bending device over which the sheet is drawn and by which its direction is changed, and means for moving the device in a substantially horizontal plane transversely of the sheet.

39. The combination with a machine for drawing sheet glass having a tank for containing molten glass and a means for drawing a sheet of glass upwardly therefrom, of a means disposed between the drawing means and the point of origin of the sheet and moving transversely over the surface of the sheet for smoothing the glass after it is drawn from the tank.

40. The combination with a machine for drawing sheet glass having a tank for containing molten glass and a means for drawing a sheet of glass upwardly therefrom, of a means disposed between the drawing means and the point of origin of the sheet and moving transversely over the surface of the sheet for smoothing the glass before it cools.

41. The combination with a machine for drawing sheet glass having a tank for containing molten glass and a means for drawing a sheet of glass upwardly therefrom, of a means disposed between the drawing means and the point of origin of the sheet and moving in the direction of the sheet over the surface of the sheet for smoothing the glass after it is drawn from the tank.

42. The combination with a machine for drawing sheet glass having a tank for containing molten glass and a means for drawing a sheet of glass therefrom, of a series of spaced smoothing blocks for engaging the surface of the sheet and means for moving them with respect to the sheet.

43. The combination with a means for drawing a sheet of glass, of a bending device over which the sheet is drawn comprising a series of spaced smoothing blocks for engaging the surface of the sheet and means for moving them with respect to the glass.

44. The combination with means for drawing a sheet of glass, of a bending device over which the sheet is drawn comprising a series of spaced smoothing blocks for engaging the surface of the sheet and for stroking the sheet in a direction lengthwise thereof.

45. The combination with means for continuously drawing a sheet of glass, of means for smoothing or flattening the sheet comprising a series of flattening bars arranged to successively engage a surface of the sheet and move in contact therewith in a direction lengthwise of the sheet.

46. A machine for drawing sheet glass comprising in combination a tank for containing molten glass provided with a lateral discharge opening, a roll having a surface adjacent the discharge opening for engaging the horizontal surface of the glass in the tank and having a portion of its surface extending above the surface of the glass in the tank, and means for drawing a sheet of glass from the molten glass upwardly over the roll as the roll is rotated.

47. The combination with means to draw a sheet of glass, of a device having a curved surface over which the glass is drawn while in a soft plastic condition, said surface consisting of a material permitting relative sliding movement of said surface and the surface of the glass in contact therewith while the glass is in said condition, means for moving said device transversely to the direction of travel of the glass as the latter is drawn thereover, and means to prevent overheating of said device.

In testimony whereof, I have hereunto subscribed my name this 31st day of May, 1921.

JULIAN H. KENDIG.